US007803663B2

(12) United States Patent
Tiziani et al.

(10) Patent No.: US 7,803,663 B2
(45) Date of Patent: Sep. 28, 2010

(54) METHOD FOR MANUFACTURING A MOLDED MMC MULTI MEDIA CARD PACKAGE OBTAINED WITH LASER CUTTING

(75) Inventors: Roberto Tiziani, Nerviano (IT); Giovanni Frezza, Milan (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 782 days.

(21) Appl. No.: 11/218,309

(22) Filed: Aug. 31, 2005

(65) Prior Publication Data
US 2006/0057823 A1 Mar. 16, 2006

(30) Foreign Application Priority Data
Aug. 31, 2004 (EP) ................... 04425646

(51) Int. Cl.
*H01L 21/48* (2006.01)
(52) U.S. Cl. .............. 438/113; 438/463; 438/464; 257/E21.599
(58) Field of Classification Search ............ 438/463, 438/113, 464; 257/679, E21.599
See application file for complete search history.

(56) References Cited
U.S. PATENT DOCUMENTS
3,982,409 A * 9/1976 Conroux et al. ............ 66/1 R 5,128,282 A * 7/1992 Ormond et al. ............ 438/68
5,908,247 A * 6/1999 Leuthold et al. ........... 384/114
2005/0202651 A1* 9/2005 Akram ..................... 438/463
2005/0236378 A1* 10/2005 Boyle et al. ............ 219/121.67

FOREIGN PATENT DOCUMENTS
DE 102 52 351 A1 5/2004
JP 01292638 11/1989
JP 2001076105 3/2001

OTHER PUBLICATIONS
"sinusoid." Dictionary.com, based on the Random House Dictionary, Random HouseInc., 2009.*
"sine curve." Statemaster.com/encyclopedia/sine-curve, copyright NationMaster.com May 2003.*
European Search Report for EP 04 42 5646 dated Feb. 14, 2005.

* cited by examiner

*Primary Examiner*—Minh-Loan T Tran
*Assistant Examiner*—W. Wendy Kuo
(74) *Attorney, Agent, or Firm*—Lisa K. Jorgenson; Kevin D. Jablonski; Graybeal Jackson LLP

(57) ABSTRACT

A method is provided for manufacturing a fully moulded Multi Media Card package obtained by laser cutting wherein at least some edges and the corners around the package have rounded profile and a sufficient smoothness for a safe handling. The method includes providing a rounded groove on a substrate back side of the package, all around the package profile, and cutting the edges of said package by a laser cutting line passing through said groove. This new technique allows the use of all the 24.0 mm width of the MMC package for the substrate 2, thus increasing the surface available for electronic components.

19 Claims, 3 Drawing Sheets

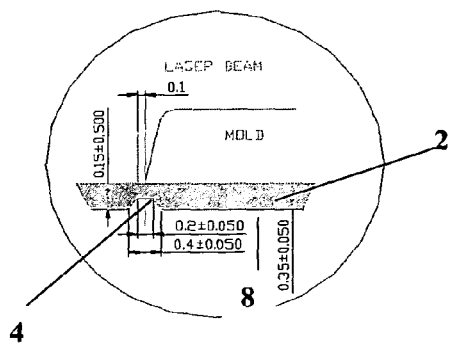
Fig. 5
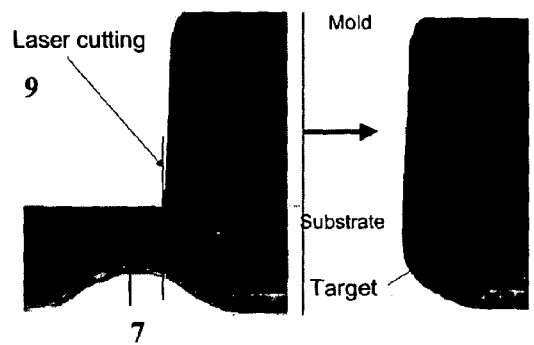
Fig. 6  Fig. 7
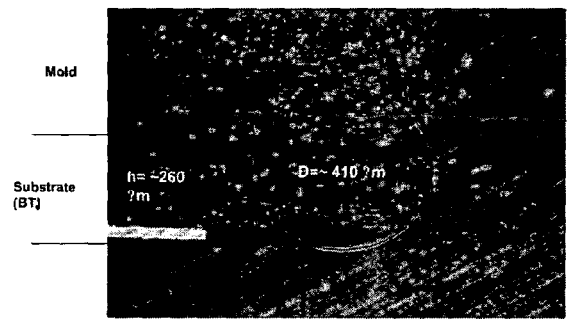
Fig. 8
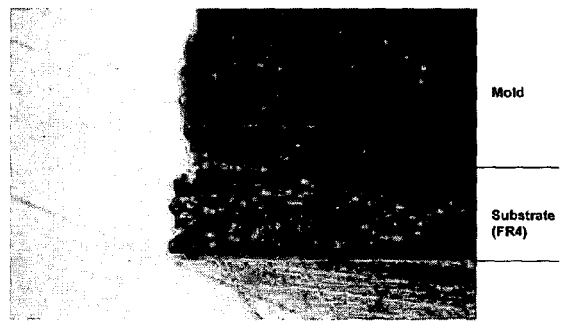
Fig. 9

METHOD FOR MANUFACTURING A MOLDED MMC MULTI MEDIA CARD PACKAGE OBTAINED WITH LASER CUTTING

PRIORITY CLAIM

This application claims priority from European patent application No. 04425646.9, filed Aug. 31, 2004, which is incorporated herein by reference,

TECHNICAL FIELD

An embodiment of the present invention relates to a method for manufacturing a fully moulded multi media card package obtained by laser cutting.

An embodiment of the invention described hereafter refers to a new technique for manufacturing of the multi media card (MMC). This embodiment is a new method for MMC singulation including at least a cutting phase with laser cutting.

BACKGROUND

A multi media card (MMC) is a product born as memory extension in applications such as: digital cameras, pocket PCs, hand phones etc. . . . This product includes a certain number of components assembled in a package defined by a MMC Organization.

The MMC may not be considered a surface mounted device (SMD), even if it's realized on a semiconductor substrate and includes a certain number of electronic components. On the contrary it is a card that the final user can handle and can insert and remove from a dedicated slot in cellular phones, digital cameras, pocket PCs and similar portable devices.

For this reason a particular outline of the product has been defined by the MMC Organization and this outline does not allow the use of the standard assembly process used for SMD.

PRIOR ART

The most advanced packaging technology for MMC production foresees that after a moulding process, similar to the one used for obtaining a SMD and in which the separation (or singulation) of each single package is done by mechanical punching before lid attachment, the final packaging will be done using an extra plastic lid that is bonded with glue on the substrate and on the mould.

In this way, a package that has a specific MMC profile, as required by MMC Media Card, has been obtained. In particular the required rounded corners on the bottom of the MMC are obtained with a proper shaping of the plastic lid.

Even though this advanced packaging technology allows the use of a SMD production line for the MMC production, there are some difficulties in the singulation and finishing operations.

Moreover the moulding thickness, which is 0.75 mm, is critical because the Sensor Die minimum thickness is 0.70 mm.

In order to increase the moulding thickness and the surface usable for components on the printed circuit board (PCB), it could be useful to increase the PCB width up to 24.0 mm, making good use of all the width of the MMC.

Nevertheless, as the MMC package outline is not a regular polygon (see the chamfer at 45 degree at one side) the standard blade process, used for singulation of SMD, cannot be applied to the MMC substrate with sufficient efficiency.

In the last years a lot of improvement has been obtained in the laser cut process for organic materials, such as the material used for PCB and as a substrate for MMC. The laser cutting can be a very interesting solution for singulation of MMC especially as the profile is not square or rectangular.

However, new PCB design requires that the substrate presents rounded corners on its bottom, but the standard laser cutting technique does not guarantee this particular shape of the substrate.

SUMMARY OF THE INVENTION

An embodiment of the present invention provides a new manufacturing technique for obtaining multi media cards by at least a laser cutting phase and with a final MMC package including rounded edges or corners.

An embodiment of the invention discloses a special substrate design and a new singulation process that allow one to obtain the particular shape of the MMC.

In particular, the new substrate design foresees a rounded groove on the substrate back side, all around the MMC profile, obtained by partial laser incision or mechanical milling cutter. This groove permits the use of standard laser cutting process for MMC singulation, obtaining the required MMC profile, and in particular the rounded corner on the bottom side of the MMC.

Moreover, this new technique permits the use of all the 24.0 mm width of MMC for the substrate, increasing the surface available for electronic components. The MMCs obtained with this new scenario are called full moulded MMC.

BRIEF DESCRIPTION OF THE DRAWINGS

Features and advantages of the method and the package according to the invention will be disclosed hereinafter by way of a non limiting example given as a best mode of realization with reference to the enclosed drawings.

FIG. 5 shows an enlarged scale particular of a said rounded groove of FIG. 4 obtained on the back side of the substrate all around the MMC package profile according to an embodiment of the invention.

FIG. 6 shows a picture obtained with a microscope of the above rounded groove before a laser cutting phase according to an embodiment of the invention.

FIG. 7 shows a picture obtained with a microscope after the execution of the laser cutting technique for the Full Moulded MMC package according to an embodiment of the invention.

FIGS. 8 and 9 show a picture comparison between the full moulded MMC edges obtained with the new laser-cutting technique (left) according to an embodiment of the invention and standard MMC edges obtained with the standard technique, respectively.

DETAILED DESCRIPTION

In order to achieve a fully moulded MMC structure, using the same moulding process used in plastic ball grid array (PBGA) and then to obtain a MMC package in complete agreement with the MMC specification requirements, a new substrate design and a new laser cutting technique for package "singulation" is proposed hereinafter according to an embodiment of the invention.

In fact, a laser process has the advantage that a MMC can be singulated by sawing only the substrate and following the package profile with good accuracy, position by position.

The main requirement that distinguishes the MMC from the standard SMD packages is that people should be able to safely handle the MMC package. For this reason, at least some of corners all around the package and at least some of the edges are not sharp, but are sufficiently smooth, as shown in FIG. 3.

Figure 3:
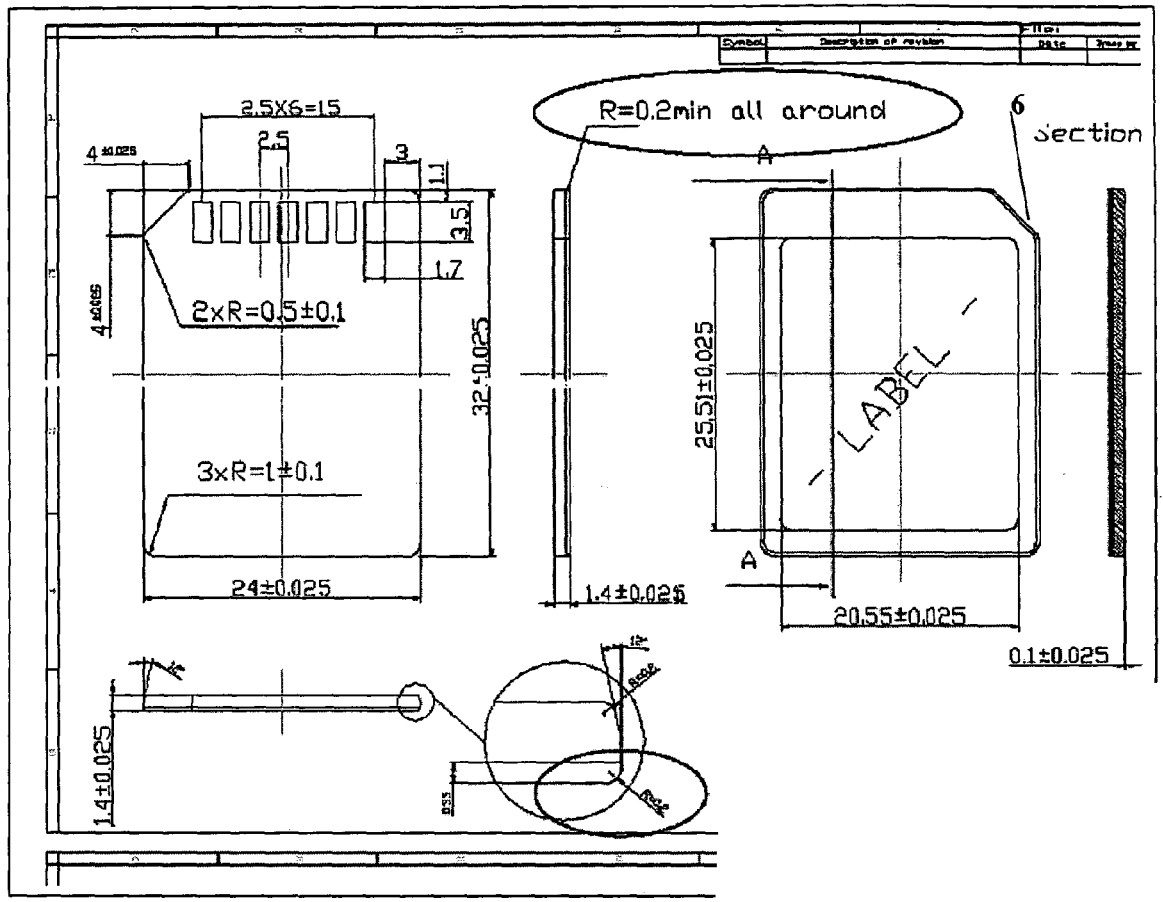
FIG. 3 shows a MMC card dimensions specification defined by the MMC Organization.

Moreover, the MMC package outline is a not regular polygon as it presents a 45° chamfer, as shown in FIG. 3.

The two requirements here above described impede the application of both the standard blade process and the standard laser cutting technique to the production of a MMC.

Figure 1:
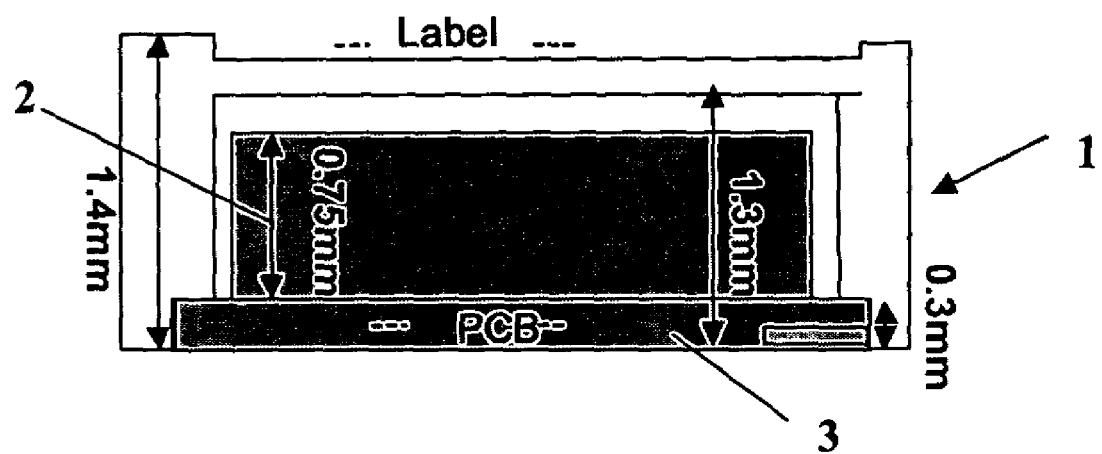
FIG. 1 shows a pictorial view of a MMC already in production with an indication of the main dimensions.

FIG. 1 shows a schematic view of a MMC package 1 according to the prior art with its main dimensions. Note that the dimensions of the substrate 2 do not make good use of the 24.0 mm width of the PCB 3, thus reducing the surface available for the electronic components.

Moreover the moulding thickness, that is 0.75 mm, is often critical because the sensor die minimum thickness is 0.70 mm. In this configuration, the required rounded corners on the bottom of the MMC 1 are obtained according to the prior art with a proper shaping of the plastic lid.

Figure 2:
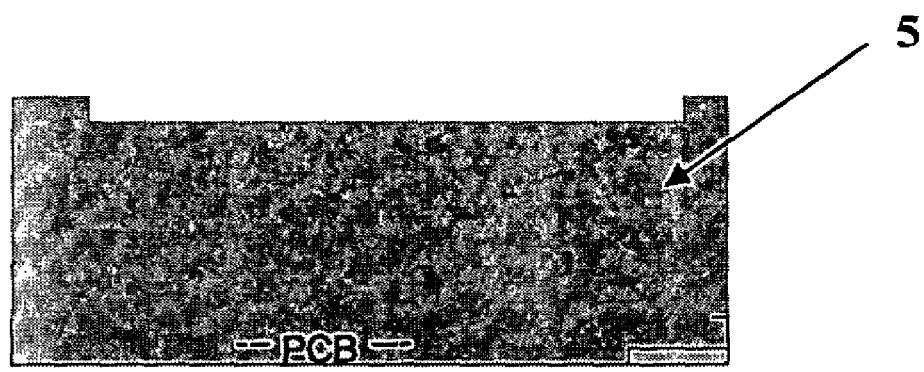
FIG. 2 shows a pictorial view of a full moulded MMC obtained with new technique according to an embodiment of the invention.

FIG. 2 shows a schematic view of a fully moulded MMC package 5 obtained with a new technique according to an embodiment of the present invention. This new technique uses all of the 24.0 mm width of the MMC package for the substrate 2, thus increasing the surface area available for electronic components.

FIG. 3 shows the MMC card dimension specification defined by the MMC Organization. Note the 45° chamfer and the rounded corner on the MMC bottom side required by the MMC Organization, as the MMC package is not an SMD package, but people should be able to safely handle these devices.

In order to apply the standard laser-cutting technique to the manufacturing process of the full moulded MMC, a special substrate design and a new singulation process are proposed according to an embodiment of the invention.

Figure 4:
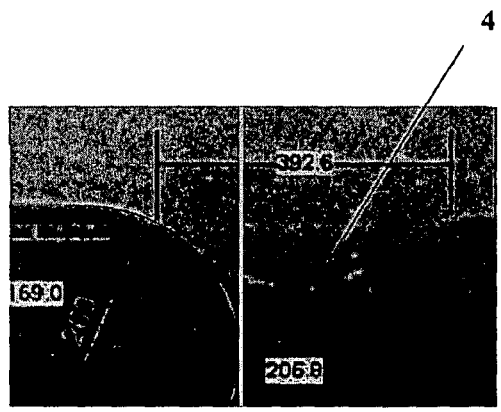
FIG. 4 shows a picture obtained with a microscope of the rounded groove on the back side of the substrate all around the MMC profile according to an embodiment of the invention.

The new substrate design provides for defining a rounded groove 4 on the substrate back side 8 all around the MMC profile, as shown in FIG. 4.

This groove has been obtained by partial laser incision or by mechanical milling cutter, using a conventional cutting process.

The groove has a partial circular shape and, more specifically looks like a half period of a sinusoidal wave according to an embodiment of the invention.

FIG. 4 shows a picture obtained with a microscope of said rounded groove on the back side of the substrate 2.

The size of the groove 4 in comparison with the substrate thickness is shown in the schematic enlarged scale view of FIG. 5.

After the groove 4 definition, a solder mask already used for the organic substrate is uniformly disposed inside the groove.

With this substrate definition, it is possible to cut the substrate with a laser (the laser beam is 0.1 mm wide) from the top side, just in correspondence of the groove 4 on the back side, as shown in FIG. 6.

FIG. 6 shows the execution of the laser cutting technique for the fully moulded MMC package of according to an embodiment of the present invention.

In this way, it is possible to obtain the profile required for MMC by the MMC Organization.

The results obtained on the full moulded MMC manufactured and singulated with this new substrate definition and laser-cutting process are very interesting. As shown in FIGS. 8 and 9, this new technique provides very smooth edges.

FIGS. 8 and 9 show a comparison between the edges of the fully moulded MMC package obtained with the laser-cutting technique according to an embodiment of the invention (left) and the edges of a conventional MMC package obtained with a conventional technique.

As may be appreciated from the example of FIG. 6, a laser cutting line 9 passes at one side of the recess peak 7 formed by the groove 4.

In other words, the laser cutting line 9 is provided very close to the point in which the curved profile of the groove 4 tends to reach a 45° slope.

According to an embodiment of the invention, the cutting point may vary according to the physical shape of the groove, but in a range of value wherein the slope of a line tangent to the grove profile is between 35° and 55°, if compared to a 0° line passing through the point of the recess peak 7.

In conclusion, advantages of this new technology according to an embodiment of the invention, called Full Moulded MMC, are listed hereafter:

cost saving;

package outline according the MMC Organization standards, and characterized by:

usable area at least 50% bigger than in the conventional capped version;

thickness of moulded cap 1.05 mm instead of 0.75 mm in the capped version (see FIG. 2);

simpler assembly process; and better reliability.

The MMC of FIGS. 2-9 may be insertable into a slot of an electronic system such as a digital camera or cell phone, or may be otherwise incorporated in such a system according to an embodiment of the invention.

In view of the above description, it will be appreciated that, although specific embodiments of the invention have been described herein for purposes of illustration, various modifications may be made without deviating from the spirit and scope of the invention.

What is claimed is:

1. A method for manufacturing a fully molded Multi Media Card package obtained by laser cutting wherein at least some edges and the corners around the package have rounded profile and a sufficient smoothness for a safe handling, the method comprising:

providing a rounded groove on a substrate back side of the package, all around the package profile; and cutting the corners of said package by a laser cutting line from the front side of the package passing through said groove such that resulting corners of the back side of the package comprise rounded edges.

2. A method according to claim 1, wherein said groove is obtained by partial laser incision or by mechanical milling cutter.

3. A method according to claim 1, wherein said laser cutting line passes at one side of a recess peak formed by the said groove.

4. A method according to claim 3, wherein said laser cutting line passes close to the point in which the curved profile of the groove tends to reach a 45° slope.

5. A method according to claim 1, wherein the shape of said groove is similar to a half a period of a sinusoidal wave.

6. A method, comprising:
   forming an integrated circuit attached to a support, the integrated circuit protruding from a front surface of the support;
   forming a sinusoidal groove in a back surface of the support; and
   cutting through the groove from the front surface of the support to separate the integrated circuit from the support, the separating resulting in a rounded edge of the back surface of the integrated circuit.

7. The method of claim 6 wherein forming the integrated circuit comprises:
   disposing an integrated-circuit die on the front surface of the support; and
   forming a molding that covers the die and a portion of the front surface of the support adjacent to the die, the integrated circuit comprising the die, the molding, and the portion of the support covered by the die and molding.

8. The method of claim 6 wherein forming the groove comprises forming the groove in alignment with and overlapping an edge of the integrated circuit.

9. The method of claim 6 wherein forming the groove comprises forming a substantially sinusoidally shaped groove that:
   is in alignment with and overlaps an edge of the integrated circuit; and
   has a peak that is offset from the edge of the integrated circuit.

10. The method of claim 6 wherein forming the groove comprises forming a substantially sinusoidally shaped groove that:
    overlaps an edge of the integrated circuit; and
    is aligned with the edge at a point of the groove having a tangent line with a slope within a range of approximately 35°-55°.

11. The method of claim 6 wherein cutting through the groove comprises cutting through the groove with a laser beam incident to the front surface of the support.

12. The method of claim 6 wherein forming the integrated circuit comprises forming a multi media card.

13. The method of claim 6 wherein forming the integrated circuit comprises forming a memory card.

14. A method, comprising:
    forming an integrated circuit attached to a support, the integrated circuit protruding from a front surface of the support;
    forming a groove in a back surface of the support; and
    cutting from the front surface of the support through the groove to separate the integrated circuit from the support, such that a resulting corner of the back surface of the integrated circuit is substantially rounded.

15. The method of claim 14 wherein forming the integrated circuit comprises:
    disposing an integrated-circuit die on the front surface of the support; and
    forming a molding that covers the die and a portion of the front surface of the support adjacent to the die, the integrated circuit comprising the die, the molding, and the portion of the support covered by the die and molding.

16. The method of claim 14 wherein forming the groove comprises forming the groove in alignment with and overlapping a corner of the integrated circuit.

17. The method of claim 1, further comprising forming the package having a thickness of approximately 24 mm.

18. The method of claim 1, further comprising forming a chamfer on one corner of the profile of the package, the chamfer having an angle of approximately 45 degrees.

19. The method of claim 1, further comprising forming the integrated circuit with a thickness suited to be in a package having a thickness of approximately 24 mm.

* * * * *

UNITED STATES PATENT AND TRADEMARK OFFICE
CERTIFICATE OF CORRECTION

PATENT NO. : 7,803,663 B2
APPLICATION NO. : 11/218309
DATED : September 28, 2010
INVENTOR(S) : Roberto Tiziani et al.

It is certified that error appears in the above-identified patent and that said Letters Patent is hereby corrected as shown below:

Claim 6, Column 5, Line 11 of the patent, please change the text "a rounded edge of the back surface" to -- a rounded edge of a back surface --.

Signed and Sealed this
Twenty-fifth Day of October, 2011

David J. Kappos
*Director of the United States Patent and Trademark Office*